Aug. 23, 1932.  J. BUSCH  1,873,737
CONSTRUCTION OF THE VOLTAGE ELECTROMAGNET OF INDUCTION DISK METER DEVICES
Filed April 5, 1932
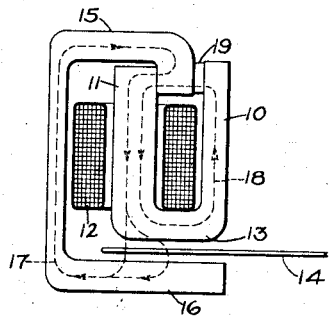
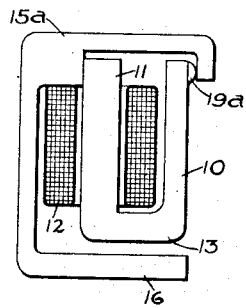
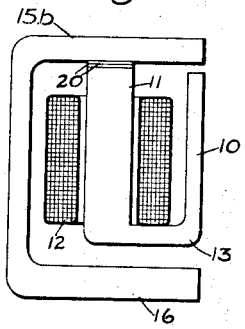
Inventor:
John Busch,
by Charles A. Mullen
His Attorney.

Patented Aug. 23, 1932

1,873,737

UNITED STATES PATENT OFFICE

JOHN BUSCH, OF BERLIN, GERMANY, ASSIGNOR TO GENERAL ELECTRIC COMPANY, A CORPORATION OF NEW YORK

CONSTRUCTION OF THE VOLTAGE ELECTROMAGNET OF INDUCTION DISK METER DEVICES

Application filed April 5, 1932, Serial No. 603,436, and in Germany April 10, 1931.

My invention relates to the construction of the voltage electromagnet of induction disk meter devices, including induction meters and relays. Its object is to provide a voltage electromagnet, the laminations of which may be stamped out with a minimum waste of material, and providing for easy assembly and easy adjustment of the flux paths after assembly.

The structure is for a voltage electromagnet of the type which includes an air gap in one of its magnetic circuits for insertion of the meter disk armature. The features of the structure which are considered to be novel and patentable will be pointed out in the claims appended hereto. For a better understanding of the invention, reference is made in the following description to the accompanying drawing showing three slightly different forms of the device, each embodying two U-shaped magnetic members suitably secured together and energized by a single coil to provide the voltage fluxes of a meter device of the type in question. In Fig. 1, one end of the outer U-shaped magnetic member has an inward extension which is embraced between the open ends of the coil carrying member; in Fig. 2, the open ends of the coil carrying member are embraced on their outside between offset portions in one of the limbs of the outer member. In these figures, adjustment of the disk air gap is made by vertically sliding one member relative to the other at the points where embraced, and in Fig. 3 use is made of one or more thin magnetic laminations between the two U-shaped members for adjusting the disk air gap.

In Fig. 1, I have shown a U-shaped magnetic member having limbs 10 and 11 of unequal cross-section, with an energizing winding 12 on the larger limb. The base portion 13 of this member forms one side of the disk air gap, the rotating disk being indicated at 14. Voltage flux is caused to pass through the disk 14 by reason of a second U-shaped magnetic member, one limb 15 of which is in magnetic contact with the open end of the coil limb 11 of the first U-shaped member. The other limb 16 of this second member lies parallel to base portion 13 and is spaced therefrom to form therewith the disk air gap.

Two parallel flux paths are thus formed, one through the disk air gap as indicated by the dotted line 17, and the other a leakage path through limb 10 as indicated by dotted line 18. It will be apparent that the relative amount of flux between these parallel paths may be readily varied by moving one part of the structure up or down with respect to the other part, since this varies the disk air gap without materially changing any other magnetic condition. Limb 15 has an off-set end portion in contact with limb 11, and a block of non-magnetic material, represented at 19, is preferably inserted between the end of limb 15 and limb 10. This limb 15 partially closes the air gap at this point, and the block of non-magnetic material allows the parts to be held together securely by the resiliency of the U-shaped member comprising parts 10, 11 and 13.

These parts are easily assembled and a form wound coil 12 is easily slipped over limb 11 prior to the assembly of the two magnetic parts. These core parts will preferably be made up of laminations, and their shape is such that both sets of laminations may be stamped from the same sheet with little waste of material.

The structure of Fig. 2 differs from Fig. 1 only in the details of joining the two magnetic sections together. Limb 15a embraces the upper ends of limbs 10 and 11 on the outside instead of on the inside thereof. 19a represents a spacing member of some non-magnetic material.

Fig. 3 shows another way of joining the two parts of the magnetic structure together. Here limb 15b is simply secured to limb 11 in any desired manner, and adjustment of the disk air gap between 13 and 16 is effected by providing one or more magnetic shims at point 20, if that is found to be necessary.

In all of the arrangements it is seen that the structure has the advantages above pointed out. The current core of the meter has not been shown, as the operation of this type of meter and relative positions of the parts are well understood, and the present invention involves no departure in these respects.

What I claim as new and desire to secure by Letters Patent of the United States is:

1. A voltage electromagnet for induction disk meter devices, comprising a U-shaped magnetic member having limbs of unequal cross-section, an energizing coil about the limb of greatest cross-section, a second U-shaped member of magnetic material having one limb in adjustable magnetic contact with the open end of the limb of greatest cross-section of the first member and partially closing the air gap across the open end thereof, the other limb of the second member being spaced from the base portion of the first member to form an adjustable disk air gap.

2. A voltage electromagnet for induction disk meter devices, comprising a U-shaped magnetic member having limbs of unequal cross-section, an energizing winding on the limb of larger cross-section, a second U-shaped magnetic member having one limb parallel to and spaced from the base portion of the first member to form a disk air gap, and with its other limb in contact with the open end of the limb of greatest cross-section of the first-mentioned U-shaped member and partially closing the air gap across the open end thereof, the two magnetic members being adjustable to vary the relative amount of flux of the electromagnet crossing the disk air gap.

3. A voltage electromagnet for induction disk meter devices, comprising a U-shaped magnetic member with an energizing coil about one limb, a second U-shaped magnetic member having one limb secured in magnetic contact with the open end of the coil limb of the first member and partially closing the air gap between the open ends of its limbs, the other limb of the second member lying parallel to the base portion of the first member and forming therewith a disk air gap, said two magnetic members being adjustable in a direction to vary the dimension of the disk air gap.

4. A voltage electromagnet for induction disk meter devices, comprising a U-shaped magnetic member with an energizing coil on one limb, a second U-shaped magnetic member having one limb in magnetic contact with the open end of the coil limb of the first-mentioned U-shaped member and secured in spaced relation from the other limb thereof by a block of non-magnetic material, the other limb of the second U-shaped magnetic member lying parallel to and spaced from the base portion of the first-mentioned U-shaped member to form a disk air gap, said parts being adjustable in a direction to vary the dimensions of the air gap.

In witness whereof, I have hereunto set my hand.

JOHN BUSCH.